US008244747B2

(12) United States Patent
Agrawal et al.

(10) Patent No.: US 8,244,747 B2
(45) Date of Patent: Aug. 14, 2012

(54) MIDDLEWARE FOR QUERY PROCESSING ACROSS A NETWORK OF RFID DATABASES

(75) Inventors: Rakesh Agrawal, San Jose, CA (US); Alvin K. Cheung, San Francisco, CA (US); Karin Kailing, San Jose, CA (US); Stefan Schoenauer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1155 days.

(21) Appl. No.: 11/566,931

(22) Filed: Dec. 5, 2006

(65) Prior Publication Data
US 2008/0129452 A1     Jun. 5, 2008

(51) Int. Cl.
*G06F 17/30* (2006.01)

(52) U.S. Cl. ........................................ 707/759
(58) Field of Classification Search .................. None
See application file for complete search history.

(56) References Cited

U.S. PATENT DOCUMENTS

| | | |
|---|---|---|
| 5,600,831 A | 2/1997 | Levy et al. |
| 5,634,053 A | 5/1997 | Noble et al. |
| 5,745,746 A | 4/1998 | Jhingran et al. |
| 6,076,087 A | 6/2000 | Suciu |
| 6,957,214 B2 | 10/2005 | Silberberg et al. |
| 7,472,112 B2 * | 12/2008 | Pfleiger et al. ........................ 1/1 |
| 7,551,082 B2 * | 6/2009 | Vishik et al. ............... 340/572.1 |
| 2003/0227392 A1 * | 12/2003 | Ebert et al. ................ 340/825.49 |
| 2004/0111410 A1 * | 6/2004 | Burgoon et al. .................... 707/4 |
| 2005/0125414 A1 | 6/2005 | Navas et al. |
| 2005/0149496 A1 | 7/2005 | Mukherjee et al. |
| 2006/0163338 A1 * | 7/2006 | Allen et al. ..................... 235/375 |

OTHER PUBLICATIONS

Rao et al. "A deferred cleaning method for RFID data Analytics". VLDB'06, Sep. 12-15, 2006.*
Christof Bornhovd et al., Integrating Automatic Data Acquisition with Business Processes—Experiences with SAP's Auto-ID infrastructure, Proc VLDB Conf., 2004, p. 1182.
Ying Hu et al., Supporting RFID-based Item Tracking Applications in Oracle DBMS Using a Bitmap Datatype, Proc. VLDB Conf., Trondheim, Norway, 2005, p. 1140.
Fusheng Wang et al., Temporal Management of RFID Data, Proceedings of the 31st VLDB Conference, Trondheim, Norway, 2005, p. 1128.
Sudarshan Chawathe et al., Managing RFID Data, Proceedings of the 30th VLDB Conference, Toronto, Canada, 2004, p. 1189.

(Continued)

*Primary Examiner* — Yuk Ting Choi
(74) *Attorney, Agent, or Firm* — IP Authority, LLC; Ramraj Soundararajan

(57) ABSTRACT

An implementation wherein RFID data is shared across independent organizations has been addressed. RFID data is usually spread across different parties, e.g. enterprises in a supply chain and thus, efficient query processing across all parties is required. Traceability is emerging as one of the key applications of RFID technology. A generic data model is introduced for querying RFID data across a network of independently operated data sources. The model can be used to facilitate traceability query processing and give a set of representative traceability queries. A newly designed process-and-forward approach is implemented for executing traceability queries.

14 Claims, 7 Drawing Sheets

OTHER PUBLICATIONS

Hector Gonzalez, et al., Warehousing and Analyzing Massive RFID Data Sets, Proceedings of the 15th Annual ICDE 2006, Arlington, Virginia, 2006, p. 162.

Gildas Avoine, Radio Frequency Identification: Adversary Model and Attacks on Existing Protocols, Tech. Rpt. LASEC-Report-2005-001, Swiss Fed. Inst. Tech., Sep. 2005.

Donald Kossmann, The State of Art in Distributed Query Processing, ACM Computing Surveys, v. 32, n. 4, Dec. 2000, p. 422.

Stephanos Androutsellis-Theotokis et al., A Survey of Peer-To-Peer Content Distribution Technologies, ACM Computing Surveys, v. 36, n. 4, Dec. 2004, p. 335.

Ion Stoica et al., Chord: A Scalable Peer-To-Peer Lookup Service for Internet Applications, Proceedings of the 2001 ACM SIGCOMM Conference., 2001, p. 149.

Fausto Ciunchiglia et al., Making Peer-to-Peer Databases Interact—A Vision for an Architecture Supporting Data Coordination, Lecture Notes in Comp. Sci, v. 2446, 2002, p. 18.

The EPCglobal Architecture Framework, Jul. 1, 2005, via Internet at http://epcglobalinc.org/home.

Mark Harrison, EPC Information Service (EPCIS), Auto-ID Centre, Institute for Manufacturing, University of Cambridge, Jan. 2004.

* cited by examiner

| Observed | | | ObsPropertySet | | | Assembled | | |
|---|---|---|---|---|---|---|---|---|
| oid | lid | ts | ... | propertyName | value | parent | child | ts |
| cylinder1 | l1 | t1 | | sentTo | ENM | | | |
| cylinder2 | l1 | t1 | | sentTo | ENM | | | |
| cylinder1 | l5 | t5 | | receivedFrom | CYM | | | |
| cylinder2 | l5 | t5 | | receivedFrom | CYM | | | |
| cylinder1 | l10 | t10 | | | | engine1 | cylinder1 | t10 |
| cylinder2 | l10 | t10 | | | | engine1 | cylinder2 | t10 |
| engine1 | l10 | t10 | | sentTo | CAM | | | |
| engine1 | l15 | t15 | | receivedFrom | ENM | | | |
| engine1 | l20 | t20 | | | | | | |
| engine1 | l22 | t25 | | | | car1 | engine1 | t25 |
| car1 | l22 | t25 | | | | | | |

FIGURE 7

MIDDLEWARE FOR QUERY PROCESSING ACROSS A NETWORK OF RFID DATABASES

BACKGROUND OF THE INVENTION

1. Field of Invention

The present invention relates generally to the field of middleware. More specifically, the present invention is related to middleware for query processing across a network of RFID databases.

2. Discussion of Prior Art

In recent years, Radio-Frequency Identification (RFID) has attracted a lot of attention. Although RFID technology is not new and can be traced back to World War II, a number of recent developments have accelerated the adoption of RFID technology in different industries.

Advancements in RFID physics and hardware technology have been pushing the average price of individual passive tags to be lower than ever. An initiative is underway in Japan to produce a 5 yen RFID tag by the end of 2006, 1.8 billion tags have been sold in 2005, and the total market opportunity for RFID has been predicted to reach seven billion dollars in 2008.

A number of legislations have pushed industries to consider RFID technology for compliance purposes. Recent laws passed in the US will require pharmaceutical industry to provide a valid pedigree of drug items upon request. Similar legislations have been formulated in the food industry, such as the Japanese Beef Traceability Law, the US Department of Agriculture national animal identification system, and the EU requirements on fish and fish products traceability.

Standardization efforts by industry consortia such as EPCglobal™ (formerly Auto-ID Center) have further promoted the adoption of RFID technology. EPCglobal™ is creating standards for RFID data communication such as a specification for RFID tag numbering formats, a transmission protocol to obtain information from RFID readers, and an overall architecture for a network of databases containing RFID data.

Recently several industry research papers have been published on RFID data management. SAP presented an overview on their existing RFID infrastructure in the paper titled "integrating Automatic Data Acquisition with Business Processes—Experiences with SAP's Auto-ID infrastructure". Under "Lessons Learned", they state that companies need to overcome their reluctance to collaborate because the full potential of RFID technology can only be unlocked through collaboration and data sharing across sites and organizations. ORACLE™ presented a new bitmap data type for ORACLE DBMS to support RFID-based item tracking applications in the paper titled "Supporting RFID-based Item Tracking Applications in ORACLE DBMS". Siemens proposed a temporal data model for their RFID data management system in the paper titled "Temporal Management of RFID data." OAT Systems™ gave a brief introduction to RFID technology, highlighting some of the data management challenges in the paper titled "Managing RFID Data".

An RFID cube is introduced in the paper titled "Warehousing and Analyzing Massive RFID Data Sets" to support warehousing and analysis of massive RFID data sets. Apart from this work, academic research has mostly focused on privacy and security issues surrounding communication between RFID reader and RFID tag. An overview can be found in the paper titled "Radio Frequency Identification: Adversary Model and Attacks on Existing Protocols". However, confidentiality of RFID data once it is stored in databases is not addressed. None of these papers presents solutions to the challenges imposed by independent organizations sharing data.

In the area of federated database systems, the issue of querying across heterogeneous data sources has been addressed, but those solutions rely on a priori knowledge about the data distribution (see paper to Kossmann titled "The State of the Art in Distributed Query Processing"). But with RFID traceability systems the distribution is unknown, since the tracked objects can move freely between organizations.

For peer-to-peer databases, work has been done on locating documents, which means to find the single place where all the information about an object is stored (see paper to Androutsellis-Theitokis et al. titled "A Survey of Peer-To-Peer Content Distribution Technologies" and the paper to Stoica et al. titled "A Scalable Peer-To-Peer Lookup Service for Internet Applications"). But in traceability systems the information about an entity is spread over several participating databases and the set of those databases may change at any point in time. Some ideas on collecting information about a single entity from several databases in a peer-to-peer setting have been presented in the paper to Giunchiglia et al. titled "Making Peer-to-Peer Databases Interact—A Vision for an Architecture Supporting Data Coordination".

In the following, two existing industry solutions for implementing query processing in traceability networks are examined. The architectures differ in the amount of data-distribution supported. A central warehouse solution where every organization publishes its RFID data to a central site is first described. After that, a solution that is proposed by EPCglobal™ is described where each organization keeps RFID data in a local repository and only publishes data to central directory services (see paper to Chawathe et al. titled "Managing RFID Data" and paper to Traub et al. titled "The EPCglobal Architecture Framework").

In the data warehouse approach, RFID data collected within each organization is published to a central data warehouse. In this case, all organizations have to agree on a common storage format for RFID data as well as for all property data they want to share with each other. Together with their data, each organization also has to publish its confidentiality or data sharing policy to the central data warehouse. Mechanisms such as web services are provided to organizations to query the stored data based on the policies installed, and query processing is performed entirely in the warehouse.

Since the heterogeneity aspects (e.g. data schema differences) do not exist in this approach, query processing is simplified as all data can be accessed in a uniform way. It becomes possible to do optimizations such as the RFID cube proposed in the paper to Gonzalez et al. titled "Warehousing and Analyzing Massive RFID Data Sets", and incoming queries can he executed as-is against the database. However, as a query might span data from multiple owners there needs to be a way to detect and enforce multiple policies from different organizations. Additionally, as the amount of RFID data increases, the total amount of data that needs to be published may put serious constraints on such a central warehouse approach.

Rather than sending all data to a central warehouse, an alternative would be to allow data to be stored in local repositories at each organization and make those repositories accessible in the traceability network. The most notable proposal in this regard is the EPCglobal Framework (see paper to Chawathe et al. titled "Managing RFID Data" and paper to Traub et al. titled "The EPCglobal Architecture Framework"), which consists of a network with nodes (referred to as subscribers in EPCglobal Framework), and a number of central registries (called core services) that the nodes can utilize. Each node offers a simple, standardized query interface (called information service) to a repository with RFID data. An application (called accessing application) can use the standardized query interface of a repository in order to obtain data.

The challenge in such a network of distributed repositories is, given a traceability query, to locate the data sources that contain tuples that contribute to the answer construction. Central directory tables can be used to guide a query to the necessary nodes. The EPCglobal Framework proposes an Object Naming Service (ONS) and a Discovery Service (DS) as its core services. The Object Naming Service provides a centralized registry through which an object may be associated with the information service at the node where the object or more specifically its tag was created. An application may also use the Discovery Service to locate the information service of all EPCglobal subscribers that have information about, the object in question. This ensures that even if the other EPCglobal subscribers within a supply chain are not known to an application, it will be able to locate all information concerning a specific object.

All nodes have to update the core services with relevant information, for instance register with the Object Naming Service when a new RFID tag is created, or update the Discovery Service when a tag moves from one node to another.

Whatever the precise merits, features, and advantages of the above mentioned prior art techniques, none of them achieves or fulfills the purposes of the present invention.

SUMMARY OF THE INVENTION

In one non-limiting example, a network of independently operated nodes sharing REID data comprises: (a) a local RFID repository; and (b) a query engine, wherein the query engine (implemented, for example, using middleware) receiving a query, retrieving data related to the query from the local RFID repository, analyzing, executing, and optionally rewriting the query based on retrieved data, and forwarding said rewritten query to another of the independently operated nodes, wherein the query is efficiently processed by combining results of query executions across a plurality of independent nodes.

In another non-limiting example, a method implemented as middleware in a node among said network of independently operated nodes comprises the steps of: (a) receiving a query; (b) retrieving data related to said query from a local RFID repository; (c) analyzing, executing and, optionally, rewriting said query based on retrieved data; and (d) forwarding said rewritten query to another of said independently operated node, wherein said query is efficiently processed by combining results of query executions across a plurality of independent nodes.

In yet another non-limiting example, an article of manufacture comprising a computer user medium having computer readable program code embodied therein implementing a middleware to query RFID data across a network of independently operated nodes sharing RFID data, wherein said middleware comprises: (a) computer readable program code aiding in receiving a query; (b) computer readable program code aiding in retrieving data related to said query from a local RFID repository; (c) computer readable program code analyzing, executing and, optionally, rewriting said query based on retrieved data; and (d) computer readable program code aiding in forwarding said rewritten query to another of said independently operated node, wherein said query is efficiently processed by combining results of query executions across a plurality of independent nodes.

In yet another non-limiting example, a method implemented across a network of independently operated nodes sharing RFID data comprises the steps of: (a) receiving a query; (b) analyzing and rewriting the query; (c) retrieving data related to the rewritten query from a local RFID repository and evaluating local results; (d) identifying additional nodes for forwarding the rewritten query; (e) forwarding the rewritten query to said identified nodes, where said rewritten query is evaluated using data in corresponding local RFID repositories to produce remote results; (f) obtaining results of evaluated query from said identified nodes; and (g) combining said evaluated local results with said remote results, wherein said query is efficiently processed by combining results of query executions across a plurality of independent nodes.

BRIEF DESCRIPTION OF THE DRAWINGS

FIG. 7 illustrates example data produced by three organizations CYM, ENM, and CAM.

DESCRIPTION OF THE PREFERRED EMBODIMENTS

Figure 1:
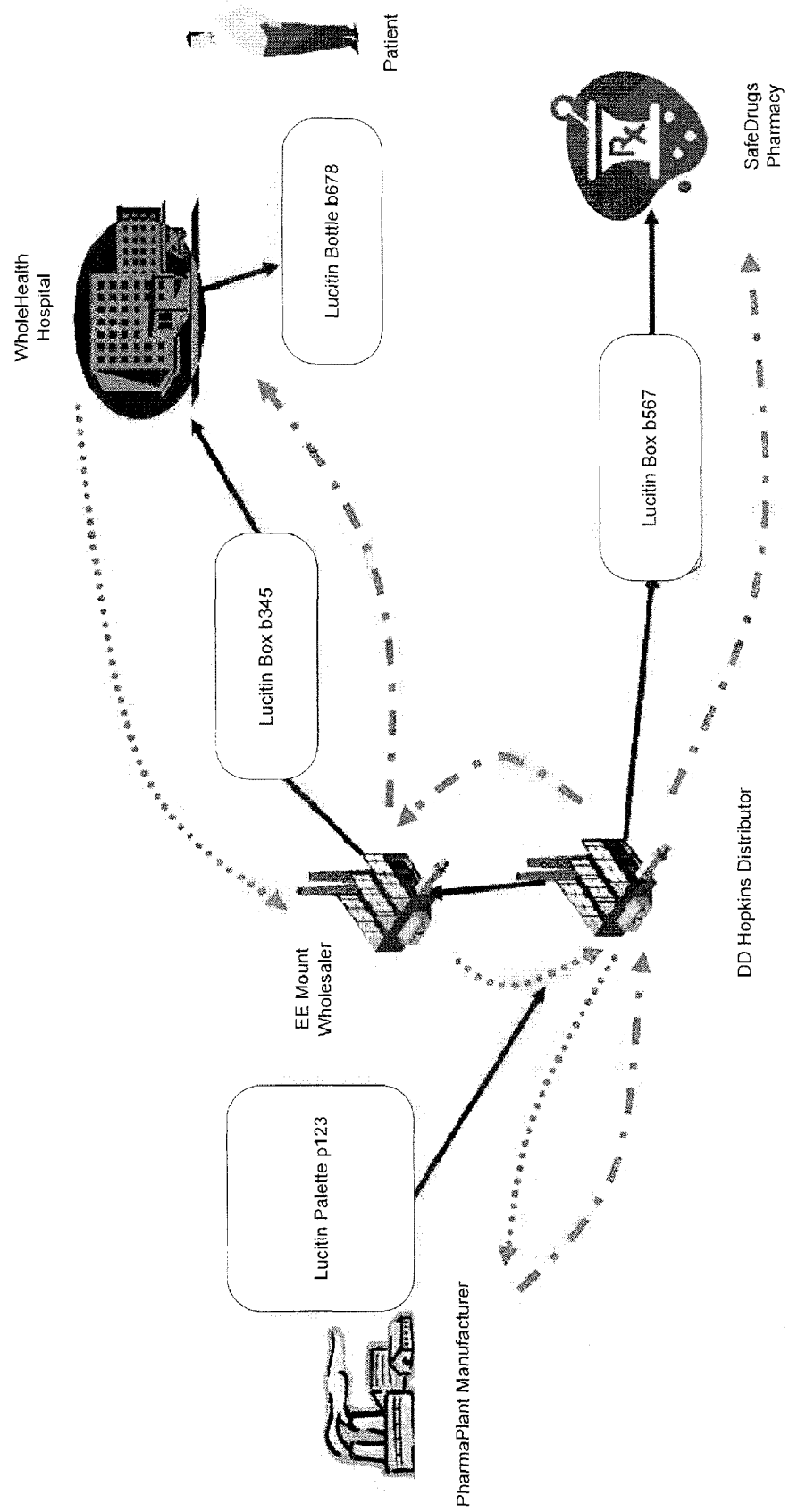
FIG. 1 illustrates traceability queries in a supply chain.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Traceability is emerging as the key application of RFID technology. Three prototypical examples are provided below of how RFID data can be used to trace products in a supply chain (see FIG. 1 for an illustration).

Pedigree Generation

At WholeHealth hospital a patient gets treated with a drug called Lucitin and shows an adverse reaction. The hospital starts an investigation to find out if something went wrong with the drug. If the drug bottle contains an RFID tag and its movement throughout the supply chain was recorded. the investigator will be able to automatically create the pedigree of the drug by tracing back its steps in the supply chain (see dotted lines in FIG. 1). Starting with the hospital each enterprise that has handled the drug will provide information, such as shipment dates and employees who processed the drug. The pedigree document can then be used to verify that the drug bottle under investigation indeed came from the manufacturer that is stated on the bottle and is not a counterfeit product.

Targeted Recall

Upon investigation PharmaPlant detects that not only bottle b678 but the whole pallet p123 containing the bottle is unsafe and needs to be taken out from the market. Traceability data allows the manufacturer to trace the forward path of p123 and its content throughout the supply chain to locate precisely the bottles that must be recalled (see dashed lines in FIG. 1), without having to issue an indiscriminate recall of every single bottle of Lucitin on the market.

Problem Detection

Traceability data can also be used to discover unusual patterns within the supply chain. For example once a set of defective products was found, an investigation might show that the majority of defective products was produced by a certain assembly line, or that most counterfeited products were handled by a certain distributor.

There are some challenges to traceability data management that must be addressed in order to realize the applications described.

Sharing Across Independent Organizations.

In most traceability applications data is spread across independent enterprises. For example, to answer recall or pedigree queries, all involved enterprises need to be located and data from heterogeneous data sources needs to be retrieved. Since data is owned by different, potentially competing, enterprises, mechanisms to limit data disclosure are necessary.

Containment of Objects.

As products move between enterprises, they can be packed into containers (e.g. pallets or boxes). In the example scenario, PharmaPlant sent a pallet of Lucitin to the distributor DDHopkins, where the pallet was broken down into two boxes. One of the boxes was sent to WholeHealth hospital via a wholesaler. At the hospital the individual pill bottles got unpacked. While the initial request for a pedigree at the hospital is for pill bottle b678, as the pill bottle's path is traced back and the request is forwarded to the distributor, the request will need to be changed to box b345 and subsequently to pallet p123.

Scalability.

The volume of data generated as a consequence of having RFID-tagged objects is enormous. A major electronics manufacturer estimates that the RFID implementations at three of its manufacturing plants alone will generate between 1 and 5 Terabytes of data per day (see literature titled "RFID: The Complete Guide"). Additionally the number of organizations that to adopt RFID technology to enable traceability is growing rapidly.

The present invention provides a system design for data management in RFID networks, geared towards efficiently and effectively supporting traceability applications. The present invention's design provides a solution to the challenges outlined above. The focus is on enabling 15 applications that depend on sharing traceability data across independent enterprises.

It is assumed that RFID data is already captured, cleaned, and stored in one or more databases. Issues related to synchronizing clocks are not addressed. Time synchronization has been studied in sensor networks (e.g. see the paper to Sunararaman et al. titled "Clock Synchronization for Wireless Sensor Networks: A Survey") as well as in ad-hoc networks (e.g. see paper to Romer et al. titled "Time Synchronization in Ad Hoc Networks"). While the requirements for time synchronization within an organization can be high, inter-organizational time synchronization is often not an issue for traceability applications. There is usually a sufficient time gap between observations made at two different organizations to tolerate asynchrony.

When designing a conceptual model for traceability networks:

The model should capture common aspects of traceability networks while allowing extensions to address specific requirements. For example, each traceability network requires objects to have a unique identifier but only pharmaceutical supply chains require that objects additionally have a national drug code.

The model should reflect the fact that independent organizations interact. It should reduce data dependencies between organizations as much as possible.

The model should provide participants of a traceability network with the ability to specify queries across the entire network. It should allow the formulation of a query without knowledge about how the data is stored, where it is located, and how a query is executed.

Basic Traceability Model

The traceability model is based on an in depth study of a number of different traceability applications including supply chain optimization, inventory visibility, pedigree generation, product recall, patient surveillance in a hospital, and cargo tracing for homeland security. ER constructs (e.g., see paper to Chen titled "The Entity-Relationship Model - Toward a Unified View of Data") are used to describe it.

Three entity types are derived: object, location, and organization.

Objects. Objects are real world entities that can be traced. Products that move through a supply chain are typical examples of objects. Objects are uniquely identifiable, for example using the Electronic Product Code (EPC).

Locations. A location is any place where objects are observed. Example locations are "manufacturing plant conveyor belt #1" and "distribution center dock door #2". Each location within a traceability network has to be uniquely identifiable, for example by a Global Location Number (GLN). Locations can be hierarchically organized as is the case for GLNs.

Organizations. An organization (e.g. manufacturer, distributor, hospital) is responsible for a set of locations. Organizations have to be uniquely identifiable. The UCC Company Prefix, a globally unique number assigned to member companies of the UCC is a common identification scheme for organizations.

Figure 2:
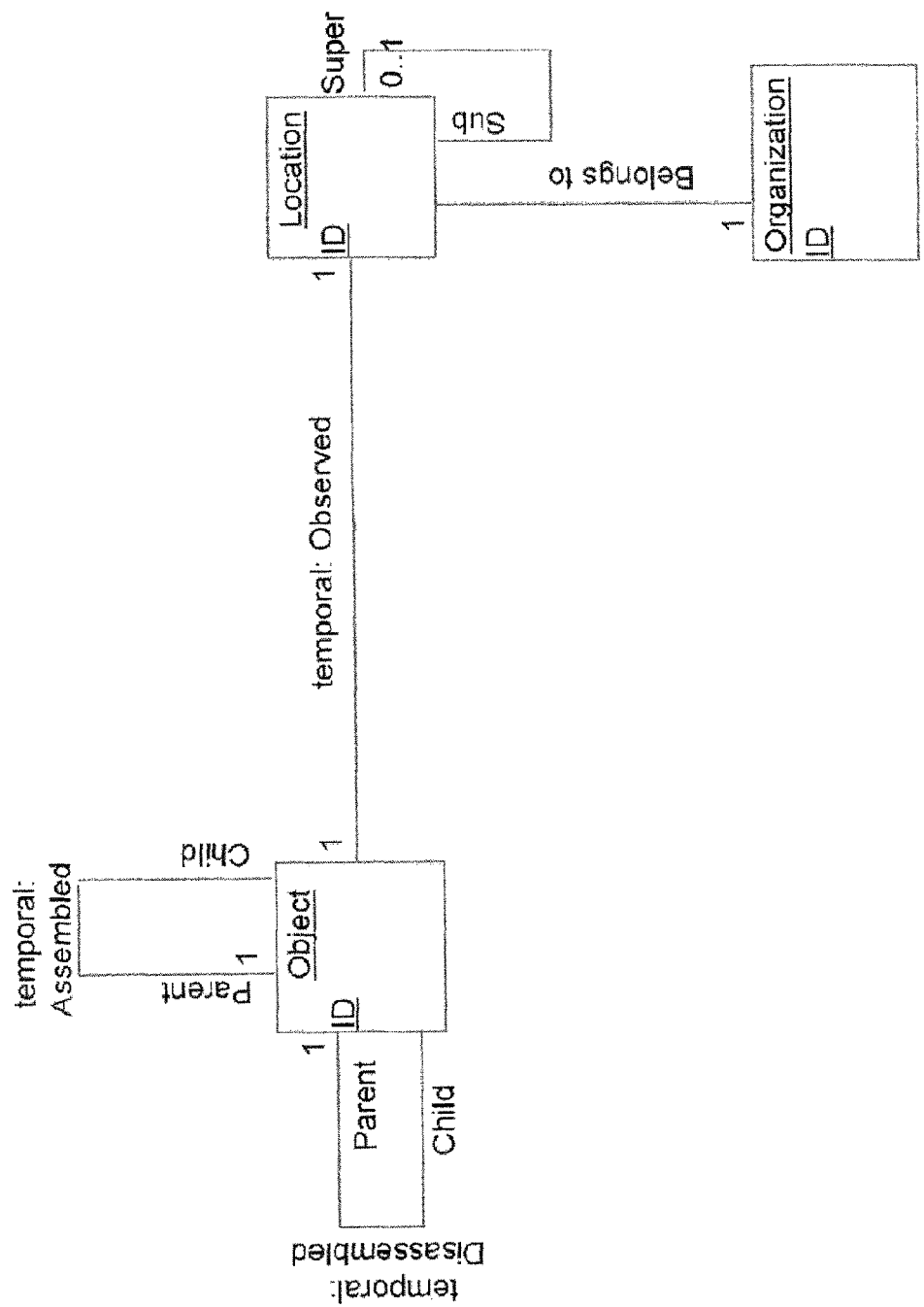
FIG. 2 illustrates an ER diagram of the present invention's basic model.

Objects interact with their environment and with each other and thereby generate events. Three different event types are presented: observation, assembly, and disassembly events, denoted as three different relationships Observed, Assembled, and Disassembled in the ER diagram (see FIG. 2).

Observed. The relationship Observed captures the fact that an object was seen at a certain location at a certain time. A ternary relationship exists between object, location, and a timestamp. For readability, the notation 'temporal: Observed' is introduced in the ER diagram to denote that each relationship instance is associated with a timestamp (see literature by Fowler titled "Analysis Patterns: Reusable Object Models").

Besides interacting with their environment, objects can also be associated with each other. The information that an object becomes the parent of another object needs to be captured. Examples of such hierarchical associations are packing (e.g. several box objects are put onto a pallet object) and product assembly (e.g. an engine block object is used to manufacture a car object). The term assembled is used to denote a hierarchical association.

Assembled. The relationship Assembled captures the fact that two objects start a parent-child-relationship at a certain time.

Diassembled. The relationship Disassembled captures the fact that two objects end a parent-child-relationship at a certain time.

It is assumed that assembly or disassembly events cannot be generated without observing the involved objects beforehand. i.e., any assembly or disassembly event is always preceded or followed by an observation event. In this case, the location where an assembly or disassembly takes place can be computed by joining the observation event with the "closest" timestamp. If assembly or disassembly does not require observation, the relationships Assembled and Disassembled can be extended to a ternary temporal relationship between objects and a location. Wang and Liu in the paper titled "Temporal Management of RFID Data" have also introduced a data model for RFID data. They allow relationships that are based on time intervals and use a relation OBJECTLOCATION to store how long an object stayed at a certain location and a relation CONTAINMENT to store how long an object was associated with another object. Some queries will benefit from such a model. However, this model introduces data dependency between organizations. Assume that manufacturer M has put a box b1 on a pallet p1, inserting a tuple (b1, p1, t1, null) into the relation Assembled. At time t2 the wholesaler W takes the box b1 of the pallet p1. Now, W has to initiate an update on M's tuple resulting in (b1, p1, t1, t2). This requires that W has write access to Ms data which makes this model impractical for traceability applications across organizations.

Extended Traceability Model

Figure 3:
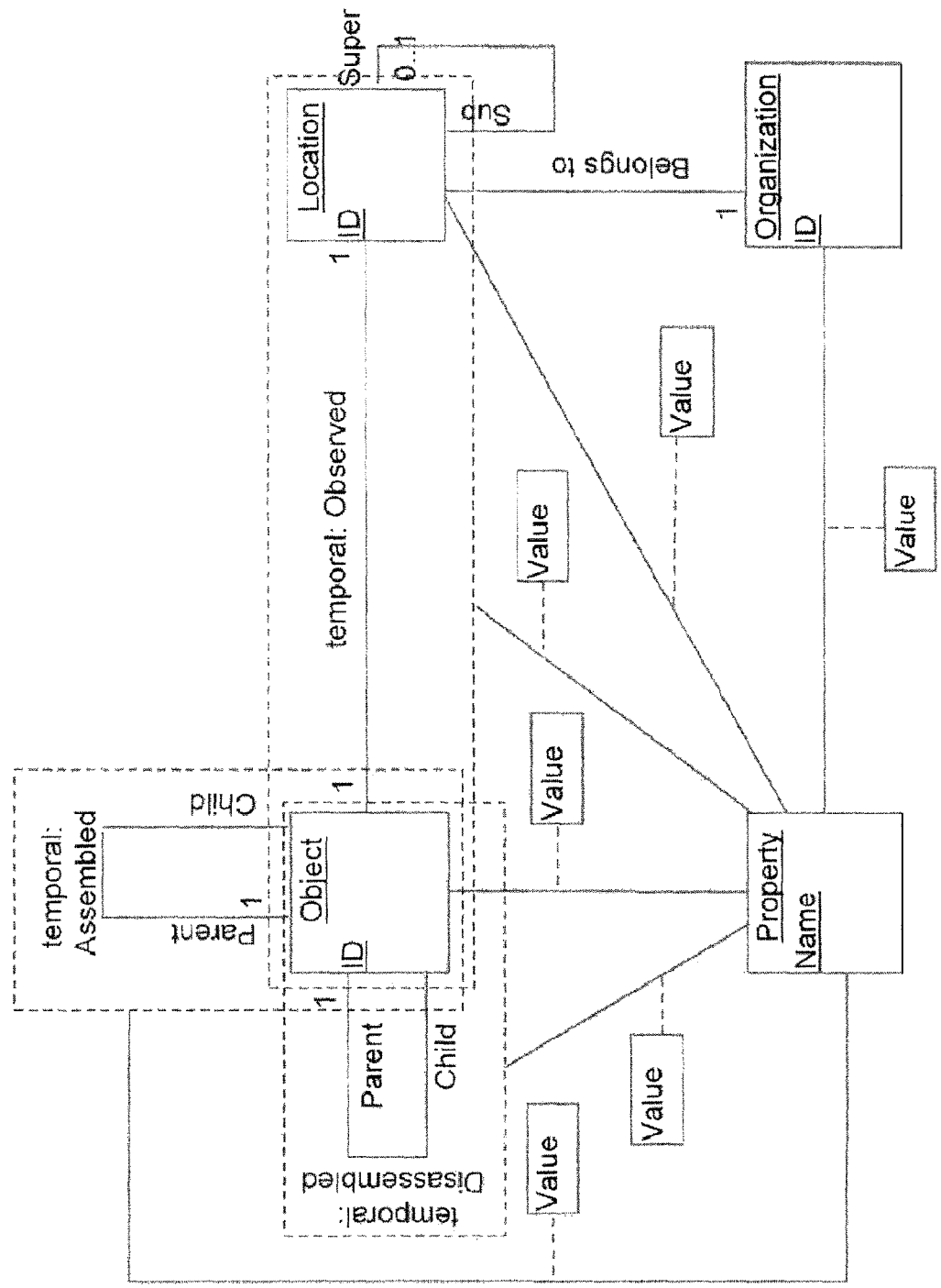
FIG. 3 illustrates an ER diagram of the present inventions complete model.

Properties as (name, value)-pairs are introduced to allow extensions to the basic traceability model. Properties can be associated with an organization, a location, or an object (e.g. company name, location address, production date, respectively). Properties can also be associated with any of the three relationships Observed, Assembled, and Disassembled. FIG. 3 shows an expanded ER diagram. Dotted lines indicate an aggregation of a relationship.

Note that in the basic model only the appearance of an object is observed. The extended model allows additionally observed information such as temperature to be recorded as a property of the Observed relationship. Such situations are quite common. For example, real-time tracking devices fitted to cargo containers automatically collect information on each container, including physical location. parameters such as temperature and humidity and sensory readings to detect intrusion.

The model can be transformed into the following relational schema.

Organization(gid)
Location(lid, parentLid, gid)
Object(oid)
Property(name)
OrgPropertySet(oid, propertyName, value)
LocPropeitySet(lid, propertyName, value)
ObjPropertySet(oid, propertyName, value)
Observed(oid, lid, ts)
Assembled(parent, child, ts)
Disassembled(parent, child, ts)
ObsPropertySet(oid, lid, ts, propertyName, value)
AsmPropertySet(oid1, oid2, ts, propertyName, value)
DsmPropertySet(oid1, oid2, ts, propertyName, value)

The attributes parent and child are oids, and the attribute ts is a timestamp.

Integration with other Data Sources

Companies will want to integrate traceability data, with existing data sources like the global data synchronization network (see the literature to Forrester Research titled "RFID: The Complete Guide"). Product information (e.g. description, brand name, color, size, and weight) can easily be represented in the current model as properties of an object. Other data sources (e.g. point of sales data) can be integrated in a similar way.

Figure 4:
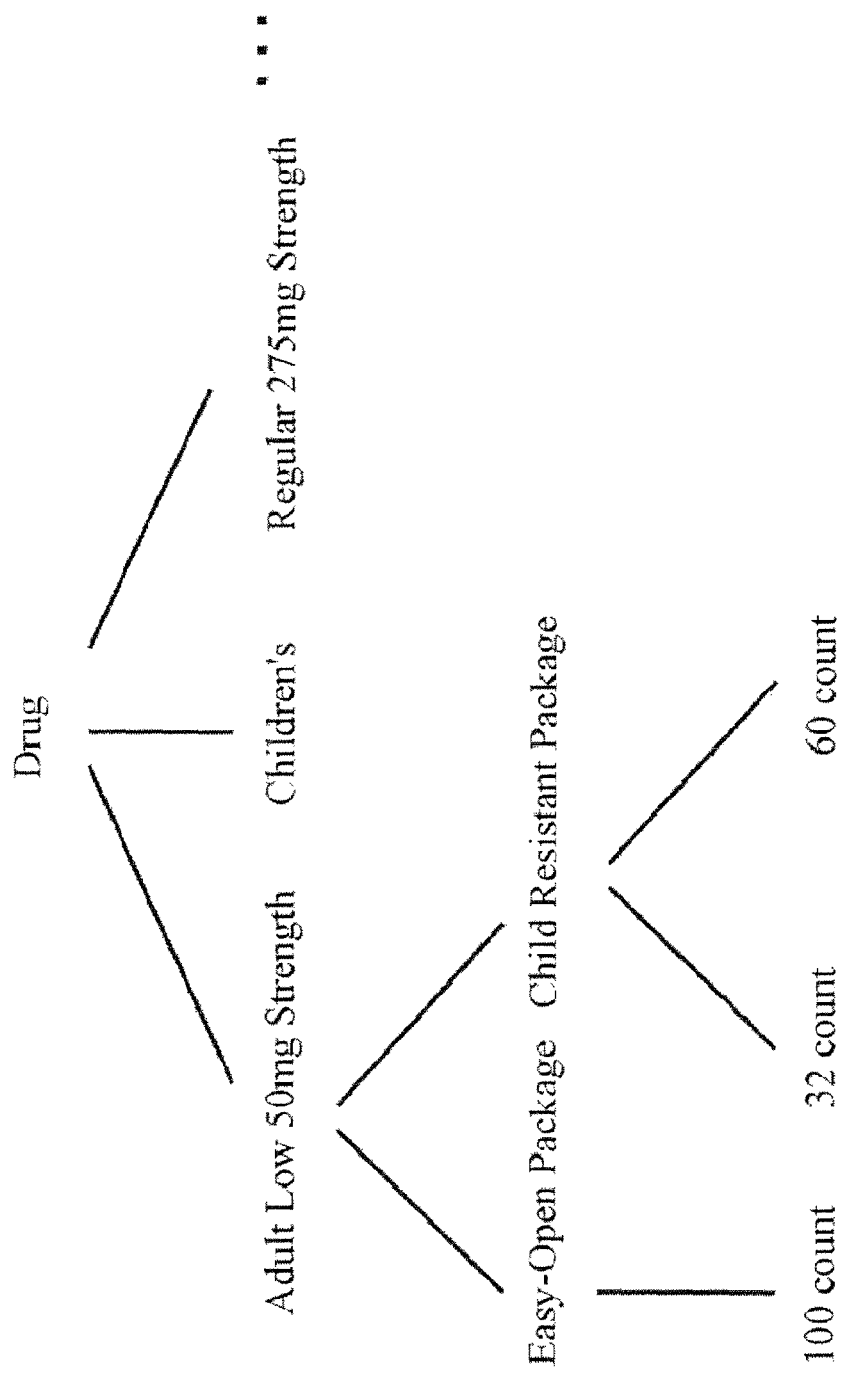
FIG. 4 illustrates part of the GTIN taxonomy.
Figure 5:
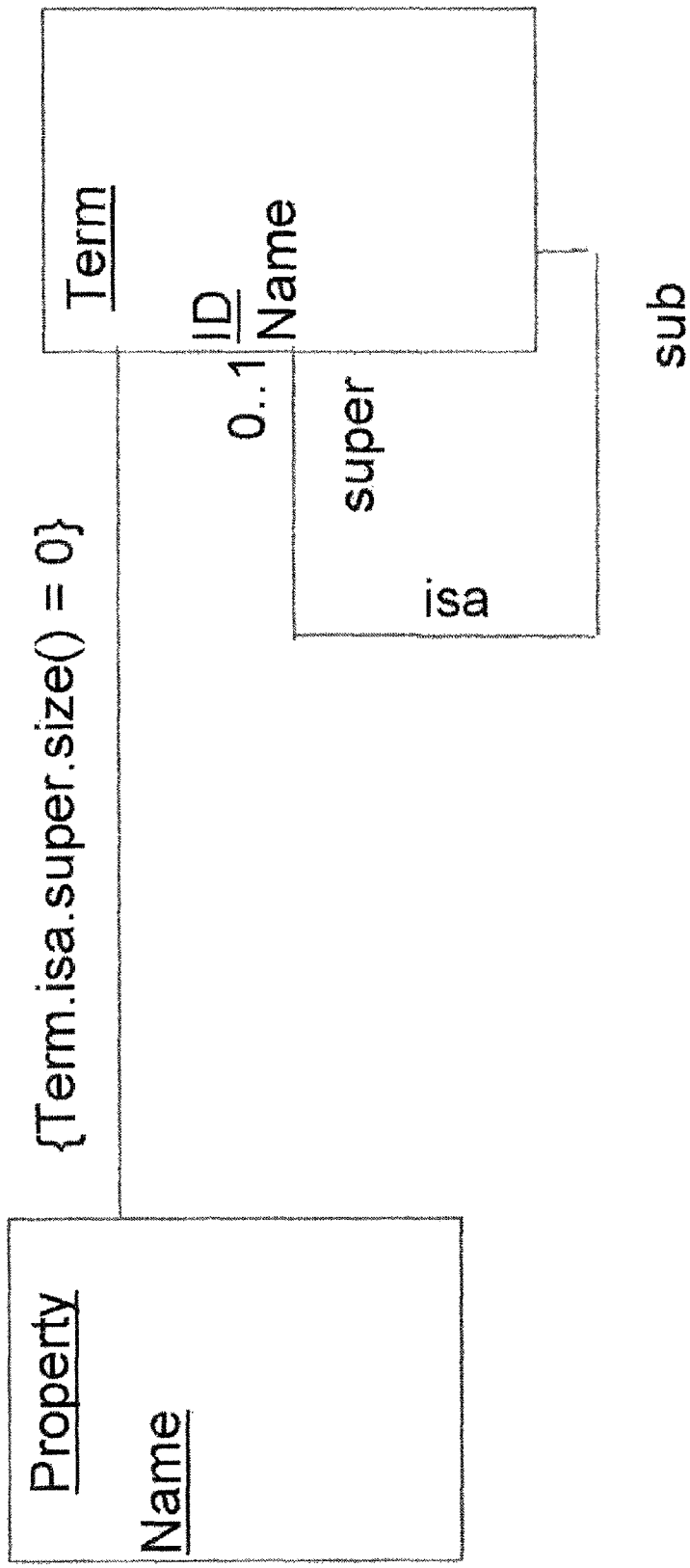
FIG. 5 illustrates the present invention's integration with a taxonomy.

Some other data however might involve taxonomies. An example is the global trade identification number (GTIN). Each trade item has a unique GTIN. Different packaging of the same product (e.g. the retail unit itself and the case of the product) has different GTINS. FIG. 4 shows part of such a taxonomy. If the user specifies a GTIN g in his query, the answer set should take into account all GTINS within the subtree rooted by g. To support this functionality the model is extended as shown in FIG. 5. The model is extended to allow a property to be related to a taxonomy represented as a hierarchy of terms. To ensure that, a property can only be associated with the root term of a taxonomy, the relationship is constrained and allows only such instances of the entity 'Term' to participate in the relationship that do not have a parent term. FIG. 5 uses an OCL-like constraint specification (see Object Management Group's OCL 2.0 Specification., Version 2.0) to impose this requirement.

The current model allows organizations to specify a query without prior knowledge about where and how data is stored within the network. However, a query specified against the global schema still needs to be executed against the local schema and data model of each organization. While a relational data model is chosen to describe the global schema an organization is free to choose a different data model (e.g. XML). Even if it chooses a relational data model, it might still choose a different schema. For example, the inventors used in experiments a different relational schema to improve the efficiency of local query processing. As only a fixed number of properties are used, a flat representation that requires less joins than the generic global representation is chosen.

Observed(oid, lid, ts, obsType, temperature)
Location(lid, locationName, locationAddress)
ObjectProperties(oid, color, maxTemp, minTemp)

To execute a global query on the local schema an organization can either provide a mechanism to rewrite global queries to conform to their schema or provide a view on to their data that fits the global schema.

Data Ownership and Distribution

If all data is stored in a central data warehouse it is important to know which organization owns which part of the data, for example to enforce privacy policies from different organizations. If data is distributed across a network it is important to know how data is distributed to locate data sources during query processing.

An advantage of the proposed model is that, every tuple in any relation is owned by exactly one organization. It is defined which part of a relation is owned by an organization i. If not otherwise mentioned, this also corresponds to which data of a relation is located at an organization i.

It is assumed that each organization presents exactly one database to the network and describes the distribution of data with respect to gid. If each location or a subset of locations has its own database. the distribution can be analogously described with respect to lid.

All information about an organization and its locations is owned by the organization itself.

$Organization_i = \sigma_{gid=i}(Organization)$
$Location_i = \sigma_{gid=i}(Location)$
$OrgPropertySet_i = \sigma_{gid=i}(OrgPropertySet)$
$LocPropertySet_i = LocPropertySet \bowtie_{lid} Location_i$ The relationships Observed, Assembled, and Disassembled are distributed across the network.

$Observed_i = Observed \bowtie_{lid} Location_i$
$Assembled_i = Assembled \bowtie_{closestTS} Observed_i$ where the predicate closestTS joins each assembly event with the immediately preceding observation event. $Disassembled_i$ can be computed analogously to $Assembled_i$.

The organization that first introduces an object to the network (i.e., that first observes the object) owns the entry for that object in the relation Object. That is, for ownership purposes $$Object_i = \pi_{oid}(\sigma_{gid=i}(min_{ts}(Object \bowtie_{oid} Observed \bowtie_{lid} Location)))$$

However, for referential integrity purposes $$Object_i = \pi_{oid}(Observed)$$

The relation Property is a dictionary of properties that are of global interest. Organizations can share a single instance of this relation or might replicate it.

Property entries associated with an object are owned by the organization that owns the object.

$$ObjPropertySet_i = ObjPropertySet \bowtie_{lid} Object_i$$

Property entries associated with observation, assembly and disassembly are owned by the organization that generated those entries. That is, such entries are distributed across the network.

$$ObjPropertySet_i = ObjPropertySet \bowtie_{oid,lid,ts} Observed_i$$
$$AsmPropertySet_i = AsmPropertySet \bowtie_{oid,lid,ts} Assembled_i$$

DsmPropertySet can be computed analogously.

Traceability Queries

How global traceability queries can be expressed in the proposed model is addressed in the following. The implications of different classes of global queries on their distributed execution are also considered. For each class, an example traceability query is given. For ease of expression the relation ObjPropertySet is abbreviated as OPS and the relation ObsPropertySet is abbreviated as BPS.

The simplest traceability queries use only selection and projection operators.

EXAMPLE 1

List all the Temperature Readings for Objects $o_1$ and $o_2$. The Query can be Formulated in Relational Algebra as:

$$\pi_{value}(\sigma_{(oid=o1 \vee oid=o2) \wedge property\,Name='temperature'}(BPS)). \quad Q1:$$

As described earlier. global relations can be partitioned horizontally such that each partition belongs exclusively to one organization. For queries that only use projection and selection operators it, is sufficient to execute the global query for each such partition and combine the results. It is sufficient to execute the query on partitions that have at least one tuple that matches the selection criteria. The key issue is how to detect all such partitions.

Queries with Local Join

The next class of queries additionally allows equi-joins on the attribute lid or gid. For such queries it is sufficient to execute the query at each organization and combine the results. As all data concerning a specific location or organization are owned by the same organization, no data needs to be joined between organizations. Such joins are called local joins.

EXAMPLE 2

Which Objects have Left Organization X and Y Between Time $t_1$ and $t_2$ $$\pi_{oid}(\sigma_{(gid='X' \vee gid='Y') \wedge t1 \leq ts \leq t2}$$
$$(Observed \bowtie_{lid} Location \bowtie_{oid,lid,ts}$$
$$(\sigma_{propertyName='obsType' \wedge value='shipped'} BPS))) \quad Q2:$$

Queries with Global Join

For all other join conditions, data from different organizations may have to be joined.

EXAMPLE 3

Which Objects Have Exceeded Their Maximum Allowed Storage Temperature?

$$\pi_{oid}(\sigma_{ops.value<bps.value}$$
$$((\sigma_{propertyName='maxTemp'}(OPS))\bowtie_{oid}$$
$$(\sigma_{propertyName='temperature'}(BPS)))) \quad Q3:$$

In this case, the information about the maximum allowed storage temperature is stored at the organization that created the object. It needs to be joined with observed temperature readings which are spread across all organizations on the object's path.

Queries with Aggregation

Most queries that contain aggregation can simply be executed at each organization and the overall aggregation can be computed based on the individual results. This applies for example to max, min, count, and sum. In some cases the global query might have to be extended before executing it at each location. For example, to compute an overall average, an additional count has to be computed at each location. Details on evaluating aggregate functions in this manner can be found in the paper to Gray et al. titled "Data Cube: A Relational Aggregation Operator Generalizing Group-By, Cross-Tab, and Sub-Totals".

EXAMPLE 4

What is the Maximum Observed Temperature for Object o?

$$max_{value}(\sigma_{propertyName='temperature' \wedge oid=o}(BPS)) \quad Q4:$$

Queries with Recursion

To express traceability queries that involve assembly and disassembly of objects recursion is needed.

EXAMPLE 5

What are All the Subcomponents of Object o?

To express this query, the transitive closure of the relation Assembled is needed.

An α-extended relational algebra (see paper to Agarwal et al. titled "An Extension of Relational Algebra to Express a Class of Recursive Queries") is used for this purpose.

$$\pi_{child}(\sigma_{parent=o}(\alpha(\pi_{parent,child}(Assembled)))) \quad Q5:$$

$(\alpha(\pi_{parent,child}(Assembled)))$ computes the transitive closure of Assembled using the attributes parent and child.

Figure 6:
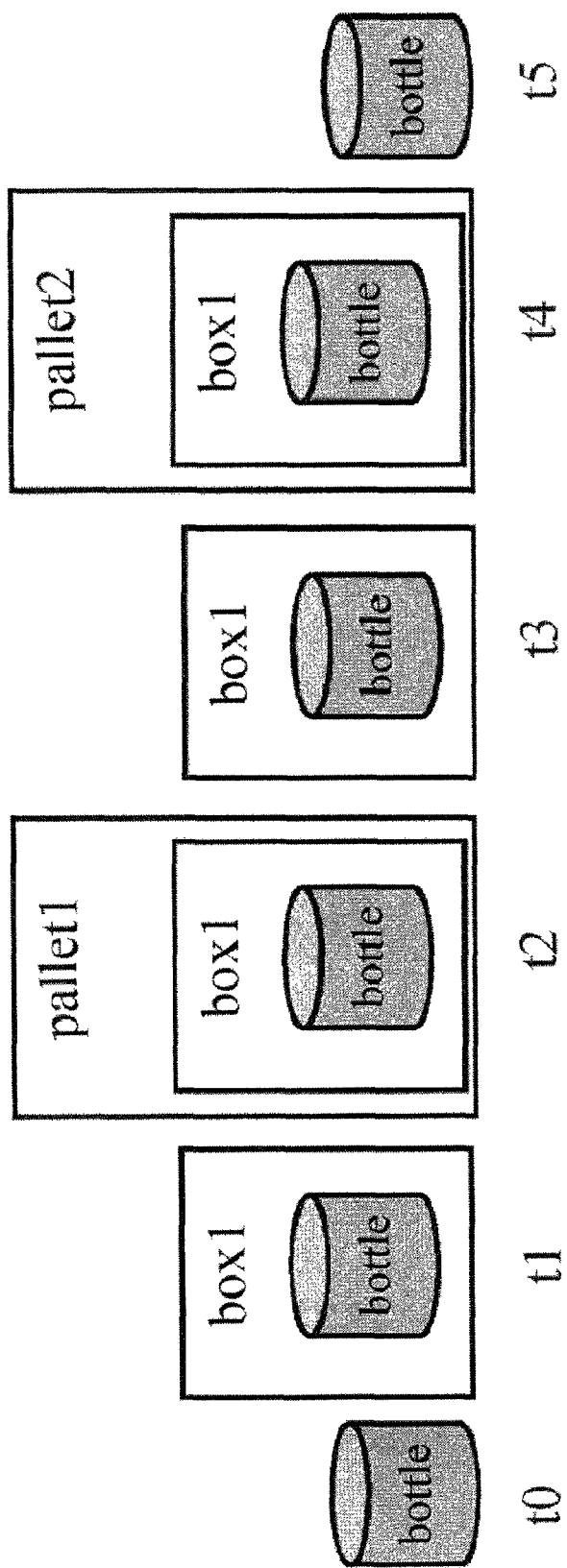
FIG. 6 illustrates the packaging history of a bottle.

Recursion might also be needed when following the path of an object. Consider for example a bottle that is packed and unpacked as illustrated in FIG. 6.

EXAMPLE 6

Return all Locations the Bottle has Passed

If the bottle passes a location while it is packed into another object, it might not be observed at that location. Reader technology might only allow to observe the outermost object, e.g. only a pallet is observed not however the boxes contained in the pallet. To construct the bottle's complete path, observations that were recorded for objects which contained the bottle at the time the observation need to be accounted for.

The relation αAssembled is introduced which computes the transitive closure of Assembled. The μ-expression chooses for each tuple t the maximal timestamp of all tuples that participated in the generation of t.

$$\alpha\text{Assembled} = \alpha_{\mu:ts=maxts(\Delta)}(\pi_{parent,child}(\text{Assembled}))$$

αDisassembled is defined analogously to αAssembled, except that this time, the minimal timestamp is selected.

A relation αContained(parent, child, lower, upper) is built that stores the time interval in which child was contained in parent by joining αAssembled and αDisassembled:

$$\alpha\text{Contained} = \pi_{A.parent,\ A.child,\ A.ts\ as\ lower,\ D.ts\ as\ upper}$$

$$(\alpha\text{Assembled A} \bowtie_{parent,child} \alpha\text{Disassembled D})$$

Based on this new relation, the example query is formulated that returns all locations the bottle passed through.

$$\pi_{lid}(\sigma_{oid=o}(\text{Observed})) \cup$$

$$\pi_{lid}(\text{Observed} \bowtie_{oid=parent \wedge lower<timestam<upper} (\sigma_{child=o}(\alpha\text{Contained})))$$ Q6:

Table 1, shown below, summarizes the different query classes and example queries.

TABLE 1

Types of traceability queries.

| Example Query | w/o join | with local join | with global join | with aggregation | with recursion |
|---|---|---|---|---|---|
| Q1 | X | | | | |
| Q2 | | X | | | |
| Q3 | | | X | | |
| Q4 | X | | | X | |
| Q5 | X | | | | X |
| Q6 | | | X | X | X |

System Design for Traceability Queries

Process and Forward Architecture

An architecture is introduced that combines all query capabilities in a query engine (implemented, for example, using middleware) that supports information sharing across multiple organizations. Given a traceability query, the query engine does query rewriting based on locally available information, locates remote data sources, forwards the query, and combines local and remote results. An approach is shown where the query engine is completely independent from any central services to locate the necessary data sources. However, if such services are available the query engine is able to exploit them.

The overall architecture consists of a data network and each node in the network has two components: an RFID data repository and a query processing component that is capable of retrieving data from the local repository and forward queries to other nodes in the network. A naming service exists in the network that assigns a unique address to each node for communication purposes (similar to the DNS in the Internet).

Query Processing

Each node processes a query to the extent it is able to, and forwards the query to other nodes in order to process it completely. The number of nodes accessed in order to completely process a query is kept minimal. In order to maintain the information which path an object took, each organization is required to store two additional properties for each shipping or receiving event. namely sentTo and receivedFrom (see FIG. 7 for an illustration). This information can be gained by joining traceability data with other enterprise data such as billing or accounting data. If an organization is not able to provide precise data, the number of nodes in the network that have to be visited increases. In the worst case, the network may have to be flooded.

The pseudo code provided below outlines some of the steps involved in an exemplary embodiment.

| processAndForward(q) |
|---|
| 1  //analyze and rewrite query appropriately |
| 2  $\{q_{remote}, q_{local}, q_{post}\}$ := analyzeAndRewrite(q) |
| 3. //obtain results from appropriate remote nodes |
| 4  if ($q_{remote}$ != null) |
| 5      r := forwardAndCombineResults($q_{remote}$) |
| 6  //combine local results with remote results |
| 7  if ($q_{local}$ != null) |
| 8      r = r ∪ executeQuery($q_{local}$,localData) |
| 9  //postprocess combined results |
| 10 if ($q_{post}$ != null) |
| 11     r = executeQuery($q_{post}$,r) |
| 12 return r |

The above described algorithm runs within the query engine at each organization. An incoming query is first analyzed and, depending on the outcome, rewritten. The details for the procedure analyzeAndRewrite are discussed below. The rewritten query is then forward to other organizations in the network and the results are united. How the relevant organizations are detected is now addressed. The algorithm for the procedure forwardAndCombineResults is shown above. The global query is also translated to a query that can be executed on the organization's data. Policy enforcement (see paper to LeFevre et al. titled "Limiting Disclosure of Hippocratic Databases") can be used to limit data disclosure. The local result is added to the results retrieved from the network. If necessary, postprocessing is done on the results. The details of query execution are illustrated using the example queries given previously.

Query Forwarding. As discussed in Section 5 all that needs to be done for queries Q1 and Q2 is to execute them at all relevant organizations and combine the results. Relevant nodes can be detected by analyzing all selection predicates in a query. Q2's selection predicate specifies two relevant organizations X and Y the query needs to be forwarded to.

Q1 does not specify any location or organization. However as the query specifies two objects $o_1$ and $o_2$ relevant organizations need to be on $o_1$'s or $o_2$'s path. If $o_1$ and $o_2$ are known (i.e., at least one observation event exists locally) they can be forwarded based on information specified by the properties sentTo and receivedFrom. Otherwise the query needs to be flooded to the network. If $o_1$ and $o_2$ were sent by different organizations two queries restricted to $o_1$ or $o_2$ respectively are sent out to the organizations that sent $o_1$ and $o_2$. The pseudo code of procedure forwardAndCombineResults is given below. Note that, although it is not shown in the pseudo code, the current implementation will group objects and send out only one query for each relevant organization.

| forwardAndCombineResults(q) |
|---|
| 1  //collect information for query routing |
| 2  orgsRelevant := extract Organizations(q) |

| | forwardAndCombineResults(q) |
|---|---|
| 3 | objsRelevant := extractObjects(q) |
| 4 | //forward query to all relevant organizations |
| 5 | for each org in orgsRelevant |
| 6 | r = r ∪ forward(org, q) |
| 7 | for each obj in objsRelevant |
| 8 | q' = restrictTo(q,obj) |
| 9 | if (obj is known) |
| 10 | if (fromOrg(obj) != null) |
| 11 | r = r ∪ forward(fromOrg(obj), q ') |
| 12 | if (toOrg(obj) != null) |
| 13 | r = r ∪ forward(toOrg(obj),q ') |
| 14 | else |
| 15 | r = r ∪ flood(q ') |
| 16 | return r |

Query Rewriting: Non-Local Join. Q3 cannot be executed as-is at every organization as data needs to be joined across organizations. A solution is to split the query such that each resulting query has only local joins. A postprocessing query is generated that operates on the results retrieved for the individual queries and produces the final result. Q3 is split into $q1 = \sigma_{propertyName=maxTemp}(OPS)$ and
$q2 = \sigma_{properyName=temperature}(BPS)$.

A query $q_{final} = \pi_{oid}(\sigma_{rq1.value<rq2.value}(rq1 \bowtie_{oid} rq2))$ is built and executed on the result rq1 and rq2. The pseudo code for handling non-local joins is given below in analyzeAndRewrite, lines 2-9.

Query Rewriting: Aggregate Functions. For the maximum function in Q4 nothing needs to be changed for the remote queries. However, a postprocessing query needs to be created that computes the overall maximum based on the individual maximum values returned. The pseudo code shown below, in lines 14-22, handles aggregation. Distributive aggregate functions like summation, algebraic aggregate functions like standard deviation and holistic aggregate functions like median have to be handled appropriately. Only the code for executing the algebraic aggregate function average is shown as an example.

Query Rewriting: Recursion. Recursion is handled by expanding the recursion as far as possible locally and adding local recursion results to the queries that are forwarded. The data shown in FIG. 7 produced by three organizations, a cylinder manufacturer CYM, an engine manufacturer ENM, and a car manufacturer CAM is used to illustrate this. An application at CAM is interested in all parts contained in object car1 (Q5). The query engine at CAM determines that the query has a recursive component p="αAssembled". Running Q5 on the locally available table αAssembled will return $r_{temp}$=engine1. Based on this information the original query is rewritten to a query $\pi_{child}(\sigma_{parent='car1' \vee parent='engine1'}(\alpha As$-sembled)) that will be forwarded to other nodes.

The query is forwarded to ENM. At ENM the same process takes place and ENM detects that engine1 contains cylinder1 and cylinder2. The query is forwarded to CYM where forwarding terminates as the recursion is no longer expanded.

The pseudo code for handling recursion is given below, lines 10-13:

| | analyzeAndRewrite(q) |
|---|---|
| 1 | $q_{remote}$ := q |
| 2 | //handle non-local joins |
| 3 | qSet := splitIntoLocalJoinQueries(q) |
| 4 | rSet := ∅ |
| 5 | $q_{final}$ := buildFinalQuery(q, qSet) |
| 6 | for each $q_{split}$ in qSet |
| 7 | rSet = rSet ∪ processAndForward($q_{split}$) |
| 8 | return executeQuery($q_{final}$, rSet) |
| 9 | //algorithm terminates |
| 10 | //handle recursion |
| 11 | for each recursive component p in q |
| 12 | $r_{temp}$ := executeQuery(p, $db_{local}$) |
| 13 | addResultsToRemoteQuery ($q_{remote}$, p, $r_{temp}$) |
| 14 | //handle aggregate functions |
| 15 | for each aggregate function f in q |
| 16 | |
| 17 | if (f is avg(X)) |
| 18 | //need count to compute overall average |
| 19 | addQueryFragment($q_{remote}$, "count(X)") |
| 20 | //determine postprocessing |
| 21 | addToPostprocess($q_{post}$, f) |
| 22 | //process other aggregate functions |
| 23 | //build local query |
| 24 | $q_{local}$ := mapToLocalSchema($q_{remote}$) |
| 25 | $q_{local}$ = enforcePolicy (qlocal) |
| 26 | return {$q_{remote}$, $q_{local}$, $q_{post}$} |

The present invention, therefore, provides for a generic query engine for sharing RFID data across independent organizations. A new paradigm is developed for processing queries across a network of data sources. A query is first processed by a data source and based on locally available information rewritten and forwarded to other data sources. Some of the advantages of this process-and-forward solution over previous approaches are outlined below.

The introduced query engine supports all traceability queries. This enables rapid development of applications on top of it as no query functionalities need to be implemented within the application.

As the amount of RFID data coming online increases, the total data transferred may put serious constraints on approaches that rely on data transfer to a central repository or a central directory service. The presented query engine does not require any data to be transferred except for queries and query results.

There is a single point of failure in the central warehouse as well as the EPCglobal approach. If the warehouse or the core services are not available, no queries can be executed. If an organization's query engine is not available in the process-and-forward approach, it only affects queries that need the offline node. If a node on the path of an entity fails, the process-and-forward approach can still process the query up to the failing node.

The process-and-forward approach leaves all control over the data to the individual organization. EPCglobal and central warehouse require organizations to surrender some or all control over their data and trust a third-party to enforce all their confidentiality requirements.

Although current RFID technology has trouble reading tags that are obscured by a container, previous approaches did not talk about how objects that are packed and unpacked can be traced across organizations. The present invention's model together with the presented algorithms provides a solution to all containment related issues. The presented solutions allow for the first time to trace objects that get packed and unpacked.

Additionally, the present invention provides for an article of manufacture comprising computer readable program code embodied therein implementing a middleware to query RFID data across a network of independently operated nodes sharing RFID data. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in the middleware are: (a) computer readable program code to aid in receiving a query; (b) computer readable program code to aid in retrieving data related to the query from a local RFID repository; (c) computer readable program code to analyze, execute and, optionally, rewrite the query based on retrieved data; and (d) computer readable program code to aid in forwarding the rewritten query to another of the independently operated node, wherein the query is efficiently processed by combining results of query executions across a plurality of independent nodes.

CONCLUSION

A system and method has been shown in the above embodiments for the effective implementation of a middleware for query processing across a network of RFID databases. While various preferred embodiments have been shown and described, it will be understood that there is no intent to limit the invention by such disclosure, but rather, it is intended to cover all modifications and alternate constructions falling within the spirit and scope of the invention, as defined in the appended claims.

The invention claimed is:

1. A network of independently operated nodes sharing RFID data comprising:
a first node comprising:
a processor; and
a non-transitory computer storage medium storing:
computer readable program code executed by said processor to implement a RFID repository local to said first node, said RFID repository local to said first node stores at least a first entity type and a first event type data, said first event type comprising a plurality of the following: a first observed event type identifying a ternary relationship between an object, a first location and a first timestamp, a first assembled event type identifying a start of a parent-child relationship between two objects, or a first disassembled event type identifying when a parent-child relationship ends between two objects; and
computer readable program code executed by said processor to implement a first query engine implemented as a first middleware, said first query engine receiving a query related to said first entity type and said first event type data, retrieving said first entity type and said first event type data related to said query from said RFID repository local to said first node, analyzing and rewriting said query based on said retrieved data and, based on one or more predicates of said query, identifying at least a second node in said network of independently operated nodes to forward said query for data related to a second entity type and a second event type, forwarding said rewritten query to said second node, and a second node comprising:
a processor; and
a non-transitory computer storage medium storing:
computer readable program code executed by said processor to implement a RFID repository local to said second node, said RFID repository local to said second node stores at least said second entity type and said second event type data, said second event type comprising a plurality of the following: a second observed event type identifying a ternary relationship between an object, location and a timestamp, a second assembled event type identifying a start of a parent-child relationship between two objects, or a second disassembled event type identifying when a parent-child relationship ends between two objects; and
computer readable program code executed by said processor to implement a second query engine implemented as a second middleware, said second query engine receives said rewritten query, retrieves data related to said second entity type and said second event type from said RFID repository local to said second node, and processes said rewritten query based on said retrieved data, and
wherein computer readable program code efficiently processes said query by combining results of query executions across at least said first and second node in said network of independently operated nodes related to said first entity type, said first event type, said second entity type, and said second event type.

2. The network of independently operated nodes sharing RFID data, as per claim 1, wherein said entity type is any of the following: a uniquely identifiable object, a uniquely identifiable location, or a uniquely identifiable organization.

3. The network of independently operated nodes sharing RFID data, as per claim 1, wherein said event type or entity type further identifies at least one property as a name, value pair.

4. The network of independently operated nodes sharing RFID data, as per claim 3, wherein said property is related to a taxonomy comprising a hierarchy of terms.

5. The network of independently operated nodes sharing RFID data, as per claim 1, wherein each node independently enforces a restriction policy limiting data disclosure.

6. The network of independently operated nodes sharing RFID data, as per claim 1, wherein said combined results are used for any of the following: pedigree generation, targeted recall of a product, detection of unusual patterns, or counterfeit detection.

7. A method implemented across a network of independently operated nodes sharing RFID data, each node uniquely addressable and comprising a local RFID repository and a query processing component, said method implemented as middleware in a node among said network of independently operated nodes comprising the steps of:
(a) implementing a RFID repository local to a first node, said RFID repository local to said first node stores at least a first entity type and a first event type data, said first event type comprising a plurality of the following: a first observed event type identifying a ternary relationship between an object, a first location and a first timestamp, a first assembled event type identifying a start of a parent-child relationship between two objects, or a first disassembled event type identifying when a parent-child relationship ends between two objects (b) implementing a first query engine implemented as a first middleware, said first query engine:
  (1) receiving a query related to said first entity type and said first event type data;
  (2) retrieving said first entity type and said first event type data related to said query from said RFID repository local to said first node;
  (3) analyzing said query and, based on one or more predicates of said query;
  (4) identifying at least a second node in said network of independently operated nodes to forward said query for data related to a second entity type and a second event type;
  (5) forwarding said query to said second node, wherein said first node:
(c) implementing a RFID repository local to said second node, said RFID repository local to said second node stores at least said second entity type and said second event type data, said second event type comprising a plurality of the following: a second observed event type identifying a ternary relationship between an object, location and a timestamp, a second assembled event type identifying a start of a parent-child relationship between two objects, or a second disassembled event type identifying when a parent-child relationship ends between two objects; and
(d) implementing a second query engine implemented as a second middleware, said second query engine:
  (1) receiving said query;
  (2) retrieving data related to said second entity type and said second event type from said RFID repository local to said second node; and
  (3) processing said query based on said retrieved data, and
wherein a computer processor executes computer readable program code to implement said method and efficiently process said query by combining results of query executions across at least said first and second node in said network of independently operated nodes related to said first entity type, said first event type, said second entity type, and said second event type.

8. The method implemented across a network of independently operated nodes sharing RFID data, as per claim 7, wherein said entity type is any of the following: a uniquely identifiable object, a uniquely identifiable location, or a uniquely identifiable organization.

9. The method implemented across a network of independently operated nodes sharing RFID data, as per claim 8, wherein said event type is any of the following:
  observed event type identifying a ternary relationship between an object, location and a timestamp,
  assembled event type identifying a start of a parent-child relationship between two objects, or
  disassembled event type identifying when a parent-child relationship ends between two objects.

10. The method implemented across a network of independently operated nodes sharing RFID data, as per claim 7, wherein said entity type or said event type further identifies at least one property as a name, value pair.

11. The method implemented across a network of independently operated nodes sharing RFID data, as per claim 10, wherein said property is related to a taxonomy comprising a hierarchy of terms.

12. The method implemented across a network of independently operated nodes sharing RFID data, as per claim 7, wherein each node independently enforces a restriction policy limiting data disclosure.

13. The method implemented across a network of independently operated nodes sharing RFID data, as per claim 7, wherein said combined results are used for any of the following: pedigree generation, targeted recall of a product, detection of unusual patterns, or counterfeit detection.

14. An article of manufacture comprising a non-transitory computer storage medium having computer readable program code embodied therein implementing a middleware to query RFID data across a network of independently operated nodes sharing RFID data, wherein said middleware comprises:
(a) computer readable program code implementing a RFID repository local to a first node, said RFID repository local to said first node stores at least a first entity type and a first event type data, said first event type comprising a plurality of the following: a first observed event type identifying a ternary relationship between an object, a first location and a first timestamp, a first assembled event type identifying a start of a parent-child relationship between two objects, or a first disassembled event type identifying when a parent-child relationship ends between two objects
(b) computer readable program code implementing a first query engine implemented as a first middleware, said first query engine:
  (1) computer readable program code receiving a query related to said first entity type and said first event type data;
  (2) computer readable program code retrieving said first entity type and said first event type data related to said query from said RFID repository local to said first node;
  (3) computer readable program code analyzing said query and, based on one or more predicates of said query;
  (4) computer readable program code identifying at least a second node in said network of independently operated nodes to forward said query for data related to a second entity type and a second event type;
  (5) computer readable program code forwarding said query to said second node, wherein said first node:
(c) computer readable program code implementing a RFID repository local to said second node, said RFID repository local to said second node stores at least said second entity type and said second event type data, said second event type comprising a plurality of the following: a second observed event type identifying a ternary relationship between an object, location and a timestamp, a second assembled event type identifying a start of a parent-child relationship between two objects, or a second disassembled event type identifying when a parent-child relationship ends between two objects; and
(d) computer readable program code implementing a second query engine implemented as a second middleware, said second query engine:
  (1) computer readable program code receiving said query;
  (2) computer readable program code retrieving data related to said second entity type and said second event type from said RFID repository local to said second node; and
  (3) computer readable program code processes said query based on said retrieved data, and
wherein computer readable program code efficiently processes said query by combining results of query executions across at least said first and second node in said network of independently operated nodes related to said first entity type, said first event type, said second entity type and said second event type.

* * * * *